(12) United States Patent
Lange et al.

(10) Patent No.: US 12,355,363 B2
(45) Date of Patent: Jul. 8, 2025

(54) ENERGY CONVERTER FOR ENERGY CONVERSION OF ELECTRICAL ENERGY INTO THERMAL ENERGY

(71) Applicant: Siemens Aktiengesellschaft, Munich (DE)

(72) Inventors: Robert Lange, Crimmitschau (DE); Marco Seja

(73) Assignee: Siemens Aktiengesellschaft, Munich (DE)

( * ) Notice: Subject to any disclaimer, the term of this patent is extended or adjusted under 35 U.S.C. 154(b) by 222 days.

(21) Appl. No.: 17/922,270

(22) PCT Filed: Apr. 7, 2021

(86) PCT No.: PCT/EP2021/059019
§ 371 (c)(1),
(2) Date: Oct. 28, 2022

(87) PCT Pub. No.: WO2021/219334
PCT Pub. Date: Nov. 4, 2021

(65) Prior Publication Data
US 2023/0179114 A1 Jun. 8, 2023

(30) Foreign Application Priority Data
Apr. 30, 2020 (EP) .................................. 20172358

(51) Int. Cl.
*H02M 7/21* (2006.01)
*H02J 13/00* (2006.01)
(Continued)

(52) U.S. Cl.
CPC ....... *H02M 7/219* (2013.01); *H02J 13/00002* (2020.01); *H02M 1/08* (2013.01)

(58) Field of Classification Search
CPC ............................... H02M 7/217; H02M 1/08
See application file for complete search history.

(56) References Cited

U.S. PATENT DOCUMENTS

| 2004/0090807 A1 | 5/2004 | Youm |
| 2012/0155139 A1* | 6/2012 | Boeke ................... H02M 7/217 323/311 |

(Continued)

FOREIGN PATENT DOCUMENTS

| CN | 205407614 U | * | 7/2016 |
| CN | 107317499 A | | 11/2017 |

(Continued)

*Primary Examiner* — Sisay G Tiku
(74) *Attorney, Agent, or Firm* — Henry M. Feiereisen LLC

(57) ABSTRACT

An energy converter includes a regenerative rectifier electrically connected to a DC voltage circuit and electrically connectable to a first AC voltage grid. The regenerative rectifier includes a first bridge arm with first and second power semiconductor modules connected in series and forming a first center-point pick-up connectable to a first AC voltage phase of the first AC voltage grid. The first power semiconductor module is electrically connected to a first DC voltage phase and the second power semiconductor module is electrically connected to a second DC voltage phase of the DC voltage circuit. First and second capacitors are connected in series and form a second center-point pick-up, with the first capacitor electrically connected to the first DC voltage phase and the second capacitor to the second DC voltage phase of the DC voltage circuit. A coil is electrically connected between the first center-point pick-up and the second center-point pick-up.

18 Claims, 3 Drawing Sheets

(51) Int. Cl.
*H02M 1/08* (2006.01)
*H02M 7/219* (2006.01)

(56) References Cited

U.S. PATENT DOCUMENTS

| | | | | |
|---|---|---|---|---|
| 2014/0070751 | A1* | 3/2014 | Niwa | H02P 3/12 |
| | | | | 318/494 |
| 2014/0104896 | A1* | 4/2014 | Tallam | H02M 7/72 |
| | | | | 363/37 |
| 2014/0241507 | A1* | 8/2014 | Woywode | H02M 3/01 |
| | | | | 378/107 |
| 2019/0238069 | A1* | 8/2019 | Martineau | H10N 30/30 |
| 2022/0052620 | A1 | 2/2022 | Du | |
| 2022/0149716 | A1* | 5/2022 | Zhang | H02M 1/123 |

FOREIGN PATENT DOCUMENTS

| | | | | | |
|---|---|---|---|---|---|
| CN | 107645203 | A | * | 1/2018 | |
| CN | 110365231 | A | | 10/2019 | |
| CN | 112271948 | A | * | 1/2021 | H02M 1/12 |
| CN | 113746362 | A | * | 12/2021 | |
| EP | 2262090 | A1 | * | 12/2010 | H02M 1/4216 |
| EP | 2996237 | A1 | | 3/2016 | |
| EP | 3407477 | A1 | * | 11/2018 | H01F 27/08 |
| JP | 2002369994 | A | * | 12/2002 | |
| KR | 20040041200 | A | * | 5/2004 | |
| WO | WO-2009119321 | A1 | * | 10/2009 | H02M 1/4216 |
| WO | WO 2011102733 | A1 | | 8/2011 | |
| WO | WO-2013105173 | A1 | * | 7/2013 | H02P 21/141 |
| WO | WO-2021090522 | A1 | * | 5/2021 | B21D 37/00 |

* cited by examiner

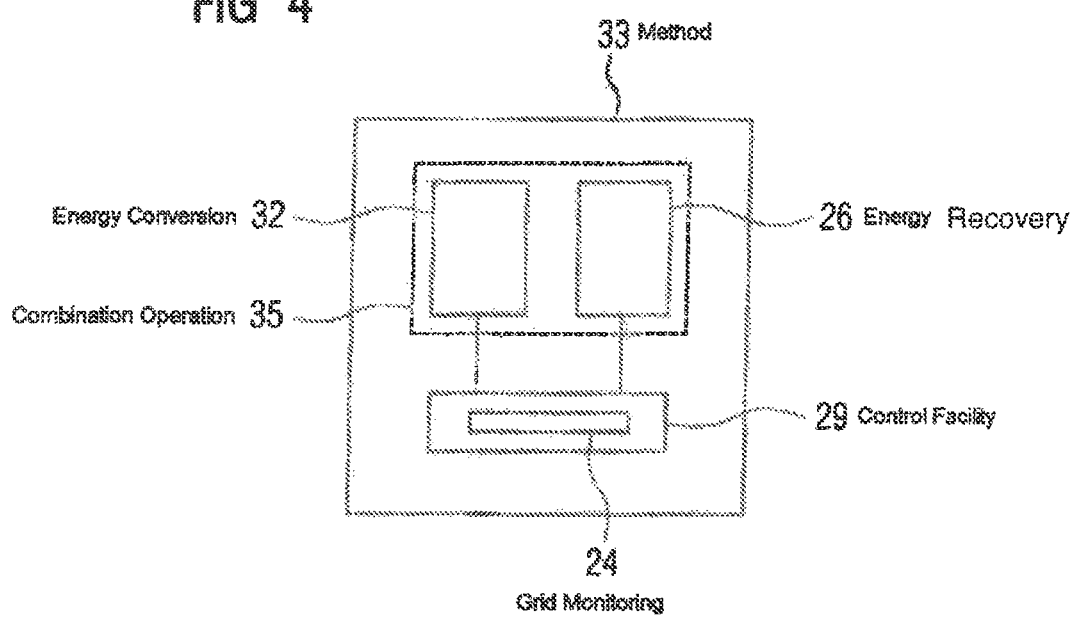

ENERGY CONVERTER FOR ENERGY CONVERSION OF ELECTRICAL ENERGY INTO THERMAL ENERGY

CROSS-REFERENCES TO RELATED APPLICATIONS

This application is the U.S. National Stage of International Application No. PCT/EP2021/059019, filed Apr. 7, 2021, which designated the United States and has been published as International Publication No. WO 2021/219334 A1 and which claims the priority of European Patent Application, Serial No. 20172358.2, filed Apr. 30, 2020, pursuant to 35 U.S.C. 119 (a)-(d).

BACKGROUND OF THE INVENTION

The invention relates to an energy converter for energy conversion of electrical energy into thermal energy, which has a regenerative rectifier, a coil and a first and a second capacitor, wherein the regenerative rectifier is electrically connected to a DC voltage circuit and can be electrically connected to a first AC voltage grid. The invention relates, moreover, to a transducer with the energy converter and to a method of the energy converter.

Electrical transducers are often used in electrical drive technology, with these transducers often having a rectifier, which converts the electrical energy from an AC voltage grid as a supply grid into a DC voltage circuit (also known, for example in the case of frequency transducers, as a DC link). The DC voltage circuit also identifies here a DC voltage supply with a possibly complex configuration. For example, a (rotating) electrical DC voltage machine can be operated on the DC voltage circuit.

By means of a further conversion of the electrical energy from the DC voltage circuit into a further AC voltage grid by means of an inverter (for example in the case of a frequency transducer), a (rotating) electrical AC voltage machine can be operated on the further AC voltage grid.

If the respective electrical machine tends to be configured for smaller powers and if the AC voltage grid is designed, for example, to be two-phase with the phases L1 and N, for cost reasons an uncontrolled rectifier is also frequently used. This two-phase AC voltage grid is also known as a single phase AC voltage grid (with L1 as the phase, to which a voltage with respect to N is applied).

This uncontrolled rectifier is not capable of feeding electrical energy from the DC voltage circuit, for example in the case of generative operation or during a braking process of the respective electrical machine, back into the AC voltage grid.

Since an undesirably high electrical energy can then be applied at the DC voltage circuit, which is identified by a high voltage and a high current flow and can destroy the electrical elements on the DC voltage circuit, the electrical energy can be converted, for example by means of an ohmic resistor, also known as braking resistor, into thermal energy.

Since the braking resistor is generally also only configured for a limited conversion of the electrical energy into thermal energy, a power semiconductor switch is often still connected upstream of it. This power semiconductor switch (also known as a power semiconductor chopper) permits a defined current flow, so excessive, possibly destructive, heating of the braking resistor is prevented.

This technical solution, consisting of braking resistance (power resistance) and possibly controllable power semiconductor chopper, is usually very cost-intensive, however and sometimes complicated to operate for the described conditions of use.

During the course of an intentionally efficient and consumption-optimized use of electrical energy, even in the case of drive systems with lower power an energy recovery of the electrical energy, which can be generated for example during the braking process, from the DC voltage circuit into the AC voltage grid is now often provided as the supply grid. This is basically possible with a controlled, regenerative rectifier.

It is not always possible to ensure that the supply grid has the capacity or basically the ability to safely receive the electrical energy from the DC voltage circuit at all times, however. If, for example, the safety device for protecting the transducer or the rectifier in the supply grid has tripped, energy recovery of the electrical energy into the supply grid is no longer possible for this reason alone.

The above considerations for the drive system substantially also apply to an energy supply or synergy transfer system. Here a conversion of excess electrical energy present in the DC voltage circuit into thermal energy or energy recovery of the excess electrical energy into the supply grid with the described consequences or problems in the drive system is usually likewise necessary.

The invention is therefore based on the object of proposing an energy converter and a transducer and a method of the energy converter, which are improved with respect to the prior art, by means of which electrical energy can be efficiently and safely converted into thermal energy.

SUMMARY OF THE INVENTION

The object is achieved by an energy converter as set forth hereinafter, by a transducer with the energy converter as set forth hereinafter and by a method of the energy converter as set forth hereinafter.

For the solution to the object, an energy converter for energy conversion of electrical energy into thermal energy is proposed, which has a regenerative rectifier, a coil and a first and a second capacitor, wherein the regenerative rectifier is electrically connected to a DC voltage circuit and can be electrically connected to a first AC voltage grid, wherein the regenerative rectifier has a first bridge arm with a first and a second power semiconductor module, wherein the first and second power semiconductor modules are connected in series and form a first center-point pick-up, wherein the first power semiconductor module is electrically connected to a first DC voltage phase and the second power semiconductor module to a second DC voltage phase of the DC voltage circuit, wherein the first and the second capacitors are connected in series and form a second center-point pick-up, wherein the first capacitor is electrically connected to the first DC voltage phase and the second capacitor to the second DC voltage phase of the DC voltage circuit and wherein the coil is electrically connected between the first center-point pick-up and the second center-point pick-up.

Contrary to previous solutions, which demand for example a cost-intensive braking resistor that is comparatively complicated to operate, with power semiconductor copper possibly connected upstream, electrical energy can advantageously be efficiently discharged from the DC voltage circuit via the two power semiconductor modules and be operated effortlessly by means of the coil and the two capacitors.

For this, the excess electrical energy available at the DC voltage circuit and which the two capacitors can no longer absorb owing to the configuration of their electrical capacitance, can be converted by the coil into thermal energy.

Compared, for example, to a frequency transducer with a regenerative rectifier, which can be operated together with DC link capacitors, comparable here with the first and second capacitors, on the DC link, comparable here on the DC voltage circuit, the coil is also arranged as a lossy inductor between the first and second center-point taps.

In this connection, a lossy inductor means that the coil should intentionally cause high electrical losses during the energy conversion, in other words the reduction of the excess electrical energy of the DC voltage circuit, by means of conversion of the electrical energy into thermal energy in the case of a current flow through the coil to the first or second capacitor.

The regenerative rectifier is basically provided both to feed, by means of a connection to the first AC voltage grid, electrical energy into the DC voltage circuit, and thus operate electrical loads via the DC voltage circuit accordingly, as well as feed electrical energy, which can be generated by corresponding electrical energy generators (for example via solar panels, accumulators, generators or in the case of braking, generatively operated motors) from the DC voltage circuit back into the first AC voltage grid.

Advantageous embodiments of the energy converter are disclosed in the dependent claims.

In a first advantageous embodiment of the energy converter, a metal apparatus is arranged on the coil and by means of the coil, electrical energy can be induced in the metal apparatus and converted into thermal energy.

The technical effect, which is established by the coil during the energy conversion from electrical energy into thermal energy is advantageously intensified in that the electrical energy is induced by the coil in the metal apparatus and there too, or substantially there, generates lost heat by means of the eddy current principle.

For this, the metal apparatus can advantageously be composed of a ferromagnetic material, which has a specific electrical resistance $\rho$ (Ro) in a range from 0.1-1 $\Omega*mm^2/m$ and is characteristic of iron and stainless steel.

By means of the alternately operable two power semiconductor modules, a changing direction of the current flow through the coil can be generated, and this can bring about a magnetic field in the metal apparatus which changes over time and in turn makes it possible to generate an eddy current flow, so the electrical energy is then converted into thermal energy.

The metal apparatus can also be designed as a housing, for example of the rectifier or a transducer, in which the electrical energy can be induced.

Furthermore, the metal apparatus can have a heat sink, which absorbs the heat generated during the energy conversion and dissipates it to the surroundings.

In a further advantageous embodiment of the energy converter, the regenerative rectifier has a second bridge arm with a third and a fourth power semiconductor module connected in series, the third and fourth power semiconductor modules from a third center-point pick-up, the first center-point pick-up can be connected to a first AC voltage phase and the third center-point pick-up to a second AC voltage phase of the first AC voltage grid and the third power semiconductor module is electrically connected to the first DC voltage phase and the fourth power semiconductor module to the second DC voltage phase of the DC voltage circuit.

In a further advantageous embodiment of the energy converter, the first and second power semiconductor modules and, where available, the third and the fourth power semiconductor modules are in each case designed as power semiconductor switches with or without a free-wheeling diode connected in antiparallel and the power semiconductor switches can in each case be actuated via actuating signals of a control facility.

The power semiconductor switches can advantageously be designed as an Insulated Gate Bipolar Transistor (IGBT) or a Metal Oxide Semiconductor Field-Effect Transistor (MOSFET).

The free-wheeling diode connected in antiparallel to the corresponding power semiconductor switches of the power semiconductor modules are advantageous for supporting the commutation during the delivery of current between the first and second power semiconductor modules and between the third and fourth power semiconductor modules.

In a further advantageous embodiment of the energy converter, the power semiconductor switches of the first and second power semiconductor modules can be operated at a dock frequency over 40 kHz for the energy conversion.

The power semiconductor switches of the first and second power semiconductor modules can have SiC or GaN, with these power semiconductor switches then being particularly advantageously suitable for high dock frequencies over 40 kHz.

The clocking of the power semiconductor switches of the first and second power semiconductor modules at a clock frequency over 40 kHz has the advantageous effect that in these power semiconductor switches at least some of the electrical energy available in the DC voltage circuit can be converted during the energy conversion into lost heat by means of the electrical switching losses.

The high dock frequency over 40 kHz also contributes to the energy conversion from electrical energy into thermal energy by means of the coil and, if available, in combination with the metal apparatus, being able to be intensified further.

During operation of the generic energy transfer of the regenerative rectifier, in other words substantially without the energy conversion, a lower clock frequency is generally selected, and this then makes it possible to reduce rather undesirable switching losses.

In a further advantageous embodiment of the energy converter, the control facility is designed to block the respective power semiconductor switches of the third and fourth power semiconductor modules during the energy conversion by means of the respective actuating signals of the control facility for a blocking operation, in particular on the basis of grid monitoring of the first AC voltage grid.

In order, for example in the case of a power failure of the first AC voltage grid or a tripped safety device in one of the AV voltage phases of the first AC voltage grid, to establish a safe isolated state, in each case the power semiconductor switches of the third and fourth power semiconductor modules are blocked, so no current can flow through these power semiconductor switches.

Grid monitoring identifies the state of the first AC voltage grid, so for example the power failure, the tripping of the safety device but also whether the first AC voltage grid is electrically capable of absorbing the electrical energy that can be provided by the DC voltage circuit for feeding into the first AC voltage grid.

In a further advantageous embodiment of the energy converter, the control facility is designed to switch the respective power semiconductor switches of the first, second, third and fourth power semiconductor modules by means of the respective actuating signals of the control facility in such a way that for a combination operation, the energy conversion and an energy recovery of electrical energy from the DC voltage circuit into the first AC voltage grid is carried out simultaneously, in particular on the basis of grid monitoring of the first AC voltage grid.

This combination operation advantageously combines the energy recovery from the DC voltage circuit into the first AC voltage grid with simultaneous energy conversion. The electrical energy, which is to be fed back, can thus be fed back for example in a metered manner, in other words the level of energy recovery can be simultaneously limited by the energy conversion.

Simultaneously accordingly means that in combination operation, the energy conversion can be carried out parallel to the energy recovery.

Grid monitoring identifies the state of the first AC voltage grid as to whether the first AC voltage grid is electrically capable of absorbing the electrical energy that can be provided by the DC voltage circuit for feeding into the first AC voltage grid at the required level over a particular time frame.

If this is not the case, the energy conversion can advantageously be simultaneously activated for energy recovery by the control facility on the basis of the grid monitoring and for example the clock frequency of the power semiconductor switches of the first and second power semiconductor modules can be increased, in particular to a clock frequency over 40 kHz.

In a further advantageous embodiment of the energy converter, grid monitoring is designed to detect characteristic electrical values of the first AC voltage grid, in particular voltage and/or current and/or electrical power and/or frequency, for grid monitoring by means of a detection facility.

The characteristic electrical values of the first AC voltage grid, which are detected by the detection facility, accordingly describe the electrical state of the first AC voltage grid, so, for example, whether the voltage has sunk to an admissible value, a current flow is no longer occurring, or the frequency has assumed inadmissible values. This electrical information flows into the evaluation of the state of the first AC voltage grid by way of the grid monitoring, on the basis of which blocking operation or combination operation is brought about.

Detection of the characteristic electrical values of the first AC voltage grid by the detection facility can, if technically possible, be measured, calculated or ascertained in a combination of measurement and calculation. This can take place solely by way of the detection facility but also by way of the detection facility in conjunction with the control facility.

A transducer with the inventive energy converter is likewise proposed for the solution to the object.

The transducer can advantageously be operated with the energy converter and be used both in the field of electrical drive technology and electrical energy generation and distribution.

In a first advantageous embodiment of the transducer, the transducer has an inverter, with the inverter being electrically connected to the regenerative rectifier by means of the first and the second DC voltage phases of the DC voltage circuit.

In a further advantageous embodiment of the transducer of the inverter, the inverter can be electrically connected to an electrical machine by means of a second AC voltage grid.

A method of the inventive energy converter is also proposed for the solution to the object, with electrical energy being converted into thermal energy during the energy conversion by means of the power semiconductor switches of the first and second power semiconductor modules, the coil and the first and second capacitors actuated via the respective actuating signals of the control facility.

In a first advantageous embodiment of the method, the power semiconductor switches of the first and second power semiconductor modules are operated at a clock frequency over 40 kHz during the energy conversion.

In a further advantageous embodiment of the method, the control facility blocks the respective power semiconductor switches of the third and fourth power semiconductor modules during the energy conversion in blocking operation by means of the respective actuating signals of the control facility, in particular on the basis of grid monitoring of the first AC voltage grid.

In a further advantageous embodiment of the method, the regenerative rectifier is electrically connected to the first AC voltage grid and the control facility actuates the respective power semiconductor switches of the first, second, third and fourth power semiconductor modules by means of the respective actuating signals in such a way that in combination operation, the energy conversion and the energy recovery of electrical energy from the DC voltage circuit into the first AC voltage grid, is simultaneously carried out in particular on the basis of grid monitoring of the first AC voltage grid.

BRIEF DESCRIPTION OF THE DRAWING

The above-described properties, features and advantages of this invention and the manner in which they are achieved will become clearer and more comprehensible in connection with the following description of the exemplary embodiments, which will be illustrated in more detail in connection with the figures. In the drawings:

FIG. 4 shows a third schematic representation, a further exemplary embodiment relating to the method in FIG. 2 of the energy converter in FIG. 1.

DETAILED DESCRIPTION OF PREFERRED EMBODIMENTS

Figure 1:
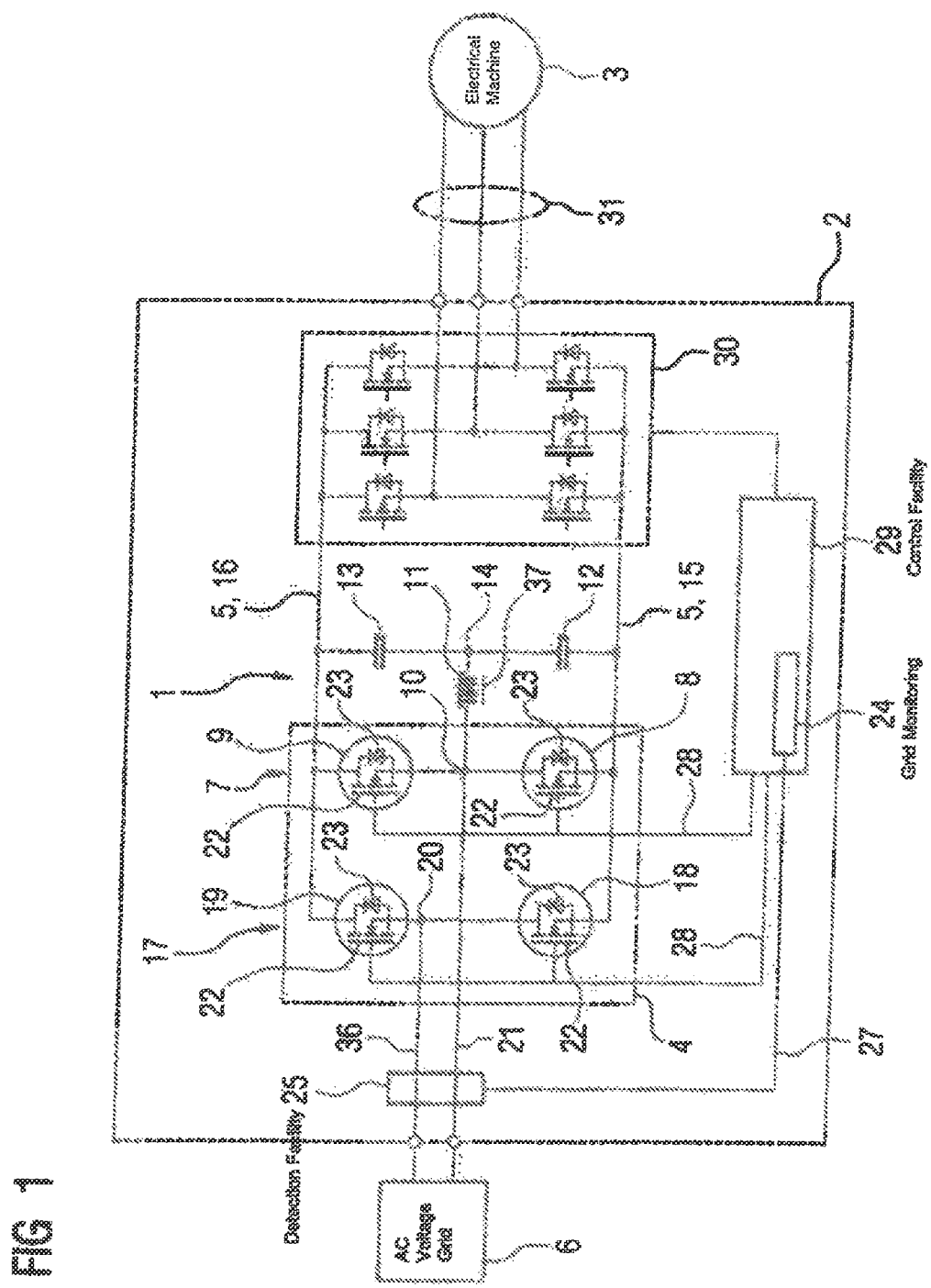
FIG. 1 shows a first schematic representation of an inventive energy converter and a transducer with the energy converter.

FIG. 1 shows a first schematic representation of an inventive energy converter 1 for energy conversion of electrical energy into thermal energy and a transducer 2 with the energy converter 1.

The energy converter 1 has a regenerative rectifier 4, a coil 11 and a first and a second capacitor 12,13.

The regenerative rectifier 4 is electrically connected to a DC voltage circuit 5 and to a first AC voltage grid 6 and comprises a first bridge arm 7 with a first and a second power semiconductor module 8,9 connected in series, and a second bridge arm 17 with a third and a fourth power semiconductor module 18,19 connected in series.

The first and second power semiconductor modules 8,9 form a first center-point pick-up 10, with the first power semiconductor module 8 being electrically connected to the first DC voltage phase 15 and the second power semiconductor module 9 to a second DC voltage phase 16 of the DC voltage circuit 5.

The third and fourth power semiconductor modules form a third center-point pick-up 20, with the third power semiconductor module 18 being electrically connected to the first DC voltage phase 15 and the fourth power semiconductor module 19 to the second DC voltage phase 16 of the DC voltage circuit 5.

The first and the second capacitor 12,13s are connected in series and form a second center-point pick-up 14, with the first capacitor 12 being electrically connected to the first DC voltage phase 15 and the second capacitor 13 to the second DC voltage phase 16 of the DC voltage circuit 5.

The coil 11 is electrically connected between the first center-point pick-up 10 and the second center-point pick-up 14.

The first center-point pick-up 10 is connected to a first AC voltage phase 21 and the third center-point pick-up 20 to a second AC voltage phase 36 of the first AC voltage grid 6.

A metal apparatus 37 is arranged on the coil 11, so during the energy conversion electrical energy can be induced in the metal apparatus 37 by means of the coil 11 and can be converted into thermal energy.

The first and second power semiconductor modules 8,9 and the third and the fourth power semiconductor modules 18,19 in each case have a power semiconductor switch 22 with a free-wheeling diode 2 connected in antiparallel, with the power semiconductor modules 8,9,18,19 being actuated by way of actuating signals 28 of a control facility 29.

The control facility 29 of the energy converter 1 comprises grid monitoring 24. Characteristic electrical values of the first AC voltage grid 6, such as voltage and/or current and/or electrical power and/or frequency, can be detected by the detection facility 25 and be transferred to the grid monitoring 24 by means of a signal line 27.

The power semiconductor switches 22 of the first and second power semiconductor modules 8,9 can be operated at a clock frequency over 40 kHz for the energy conversion.

In FIG. 1, apart from the energy converter 1, the transducer 2 also comprises an inverter 30, with the inverter 30 being electrically connected to the regenerative rectifier 4 by means of the first and the second DC voltage phases 15,16 of the DC voltage circuit 5.

The inverter 30 is electrically connected by means of a second AC voltage grid 31 to an electrical machine 3. The electrical machine 3 can thus be operated on the first AC voltage grid 6 by means of the transducer 2 and the second AC voltage grid 31.

In the application example of FIG. 1, the inverter is designed as a B6-bridge circuit, in each case with power semiconductor switches and free-wheeling diodes in each case connected in antiparallel to the power semiconductor switches and which can be actuated by means of the control facility 29 by way of a further actuating line.

Figure 2:
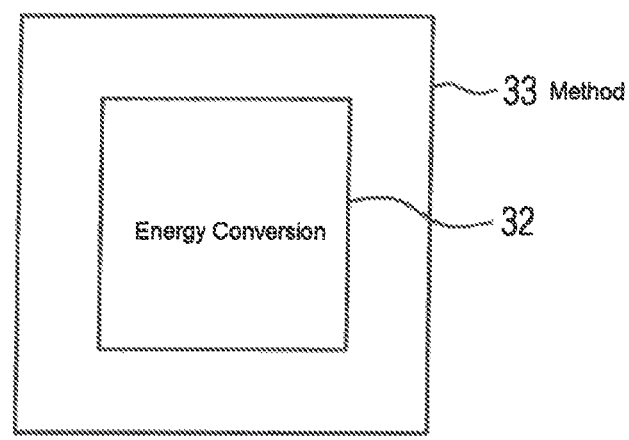
FIG. 2 shows a first schematic representation of a method of the energy converter in FIG. 1.

FIG. 2 shows a first schematic representation of a method 33 of the energy converter 1 in FIG. 1.

By means of the power semiconductor switches 22 of the first and second power semiconductor modules 8 and 9, the coil 11 and the first 12 and second 13 capacitor actuated by way of the respective actuating signals 28 of the control facility 29, electrical energy from the DC voltage circuit 5 is converted into thermal energy during the energy conversion 32.

The power semiconductor switches 22 of the first and second power semiconductor modules 8 and 9 can be operated at a clock frequency over 40 KHz for the energy conversion 32.

Figure 3:
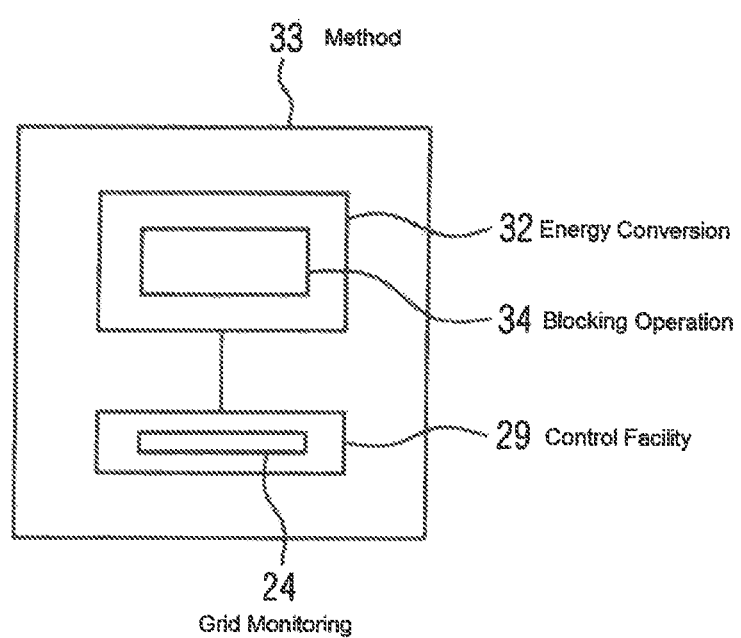
FIG. 3 shows a second schematic representation, an exemplary embodiment relating to the method in FIG. 2 of the energy converter in FIG. 1

FIG. 3 represents in a second schematic representation an exemplary embodiment relating to method 33 in FIG. 2 of the energy converter 1 in FIG. 1.

The regenerative rectifier 4 can be electrically connected to the first AC voltage grid 6 for carrying out the exemplary embodiment.

During the energy conversion 32, the control facility 29 blocks in blocking operation 34, in particular on the basis of grid monitoring 24 of the first AC voltage grid 6, the respective power semiconductor switches 22 of the third and fourth power semiconductor modules 18 and 19 by means of the respective actuating signals 28 of the control facility 29.

This occurs for example in the case of a power failure of the first AC voltage grid 6, so no current flows through these power semiconductor switches 22 and a safe electrical state of the rectifier 4 with respect to the first AC voltage grid 6 is established for carrying out the method 33 of energy conversion 32.

For blocking operation 34, the grid monitoring 24 identifies the state of the grid failure, selected by way of example, in the first AC voltage grid 6 and the control facility 29 uses this information to block the power semiconductor switches 22 of the third and fourth power semiconductor modules 18 and 19.

FIG. 4 demonstrates in a third schematic representation a further exemplary embodiment relating to the method 33 in FIG. 2 of the energy converter 1 in FIG. 1.

The regenerative rectifier 4 is electrically connected to the first AC voltage grid 6 for carrying out the further exemplary embodiment.

The control facility 29 actuates the respective power semiconductor switches 22 of the first, second, third and fourth power semiconductor modules 8. 9. 18, and 19 by means of the respective actuating signals 28, in particular on the basis of grid monitoring 24 of the first AC voltage grid 6, in such a way that in combination operation 35, the energy conversion 32 and the energy recovery 26 of electrical energy from the DC voltage circuit 5 into the first AC voltage grid 6 is simultaneously carried out.

For this, the power semiconductor switches 22 of the first and second power semiconductor modules 8 and 9 can be operated at a clock frequency over 40 kHz during the energy conversion 32.

In combination operation 35, an energy recovery 26 from the DC voltage circuit 5 into the first AC voltage grid 6 is carried out with simultaneous energy conversion 32. The electrical energy, which is to be fed back, can be regulated. The level of the energy recovery 26 can accordingly be limited by the simultaneously carried out energy conversion 32.

Simultaneously accordingly means that in combination operation 35, the energy conversion 32 can be carried out parallel to the energy recovery 26.

For combination operation 35, the grid monitoring 24 identifies the state of the first AC voltage grid 6 at least insofar as whether the first AC voltage grid 6 is electrically capable of absorbing the electrical energy that can be provided by the DC voltage circuit 5 for feeding into the first AC voltage grid at the required level over a particular time frame.

What is claimed is:

1. An energy converter for energy conversion of electrical energy into thermal energy, said energy converter comprising:
a regenerative rectifier electrically connected to a DC voltage circuit and electrically connectable to a first AC voltage grid, said regenerative rectifier comprising a first bridge arm including first and second power semiconductor modules which are connected in series and form a first center-point pick-up which is connectable to a first AC voltage phase of the first AC voltage grid, with the first power semiconductor module electrically connected to a first DC voltage phase of the DC voltage circuit and with the second power semiconductor module electrically connected to a second DC voltage phase of the DC voltage circuit;
first and second capacitors connected in series and forming a second center-point pick-up, with the first capacitor electrically connected to the first DC voltage phase of the DC voltage circuit and with the second capacitor to the second DC voltage phase;
a coil electrically connected between the first center-point pick-up and the second center-point pick-up; and
a metal apparatus arranged on the coil such that the coil is capable of inducing electrical energy in the metal apparatus and enabling the electrical energy to be converted into the thermal energy,
wherein the regenerative rectifier comprises a second bridge arm including third and fourth power semiconductor modules which are connected in series and form a third center-point pick-up which is connectable to a second AC voltage phase of the first AC voltage grid, with the third power semiconductor module electrically connected to the first AC voltage phase of the DC voltage circuit and with the fourth power semiconductor module electrically connected to the second AC voltage phase of the DC voltage circuit.

2. The energy converter of claim 1, wherein at least the first and second power semiconductor modules include each a power semiconductor switch with or without a free-wheeling diode connected in antiparallel, and further comprising a control facility designed to generate actuating signals for actuating the first and second power semiconductor modules.

3. The energy converter of claim 2, wherein the power semiconductor switch is operable at a clock frequency over 40 kHz for the energy conversion.

4. The energy converter of claim 2, wherein the third and fourth power semiconductor modules include each a power semiconductor switch with or without a free-wheeling diode connected in antiparallel, said control facility being designed to block via the actuating signals the power semiconductor switches of the third and fourth power semiconductor modules during the energy conversion for a blocking operation.

5. The energy converter of claim 4, wherein the control facility comprises a grid monitoring of the first AC voltage grid as basis for the blocking operation.

6. The energy converter of claim 5, further comprising a detection facility operably connected to the grid monitoring to detect a characteristic electrical value of the first AC voltage grid, in particular voltage and/or current and/or electrical power and/or frequency for transfer to the grid monitoring.

7. The energy converter of claim 4, wherein the control facility is designed to switch the power semiconductor switches of the first, second, third and fourth power semiconductor switches via the actuating signals in such a way that for a combination operation, the energy conversion and an energy recovery of electrical energy from the DC voltage circuit into the first AC voltage grid is simultaneously carried out.

8. The energy converter of claim 7, wherein the control facility comprises a grid monitoring of the first AC voltage grid as basis for the combination operation.

9. The energy converter of claim 8, further comprising a detection facility operably connected to the grid monitoring to detect a characteristic electrical value of the first AC voltage grid, in particular voltage and/or current and/or electrical power and/or frequency for transfer to the grid monitoring.

10. A method of operating an energy converter as set forth in claim 1, said method comprising:
generating with a control facility actuating signals for actuating power semiconductor switches of the first and second power semiconductor modules; and
converting via the actuated power semiconductor switches of the first and second power semiconductor modules, the coil and the first and second capacitors the electrical energy into the thermal energy during the energy conversion by inducing the electrical energy in the metal apparatus by the coil and converting the electrical energy into the thermal energy.

11. The method of claim 10, further comprising operating the first and second power semiconductor modules at a clock frequency over 40 kHz during the energy conversion.

12. The method of claim 10, further comprising blocking via the actuating signals power semiconductor switches of the third and fourth power semiconductor modules during the energy conversion for a blocking operation.

13. The method of claim 12, wherein the blocking operation is effected based on a grid monitoring of the first AC voltage grid.

14. The method of claim 12, further comprising:
electrically connecting the regenerative rectifier to the first AC voltage grid; and
actuating with the control facility the power semiconductor switches of the first, second, third and fourth power semiconductor modules via respective ones of the actuating signals in such a way that in a combination operation, the energy conversion and an energy recovery of electrical energy from the DC voltage circuit into the first AC voltage grid is simultaneously carried out.

15. The method of claim 14, wherein the combination operation is carried out based on a grid monitoring of the first AC voltage grid.

16. A transducer, comprising an energy converter for energy conversion of electrical energy into thermal energy, said energy converter comprising
a regenerative rectifier electrically connected to a DC voltage circuit and electrically connectable to a first AC voltage grid, said regenerative rectifier comprising a first bridge arm including first and second power semiconductor modules which are connected in series and form a first center-point pick-up which is connectable to a first AC voltage phase of the first AC voltage grid, with the first power semiconductor module electrically connected to a first DC voltage phase of the DC voltage circuit and with the second power semiconductor module electrically connected to a second DC voltage phase of the DC voltage circuit;
first and second capacitors connected in series and forming a second center-point pick-up, with the first capacitor electrically connected to the first DC voltage phase of the DC voltage circuit and with the second capacitor to the second DC voltage phase;

a coil electrically connected between the first center-point pick-up and the second center-point pick-up; and a metal apparatus arranged on the coil such that the coil is capable of inducing electrical energy in the metal apparatus and enabling the electrical energy to be converted into the thermal energy, wherein the regenerative rectifier comprises a second bridge arm including third and fourth power semiconductor modules which are connected in series and form a third center-point pick-up which is connectable to a second AC voltage phase of the first AC voltage grid, with the third power semiconductor module electrically connected to the first AC voltage phase of the DC voltage circuit and with the fourth power semiconductor module electrically connected to the second AC voltage phase of the DC voltage circuit.

17. The transducer of claim 16, further comprising an inverter electrically connected via the first and second DC voltage phases of the DC voltage circuit to the regenerative rectifier.

18. The transducer of claim 17 wherein the inverter is electrically connectable via a second AC voltage grid to an electric machine.

* * * * *